US012651348B2

(12) United States Patent　　　(10) Patent No.: US 12,651,348 B2

Kodama　　　(45) Date of Patent: Jun. 9, 2026

(54) IMAGE PROCESSING APPARATUS, IMAGE READING DEVICE, IMAGE FORMING APPARATUS, AND IMAGE PROCESSING METHOD

(71) Applicant: Taku Kodama, Tokyo (JP)

(72) Inventor: Taku Kodama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 18/630,133

(22) Filed: Apr. 9, 2024

(65) Prior Publication Data

US 2024/0354961 A1　　Oct. 24, 2024

(30) Foreign Application Priority Data

Apr. 18, 2023　(JP) ................................. 2023-068123

(51) Int. Cl.
　　*G06T 7/13*　　　(2017.01)
　　*G06V 10/44*　　(2022.01)
(52) U.S. Cl.
　　CPC ................ *G06T 7/13* (2017.01); *G06V 10/44* (2022.01)
(58) Field of Classification Search
　　CPC ... G06V 10/44; G06V 10/243; G06V 30/1478
　　See application file for complete search history.

(56) References Cited

U.S. PATENT DOCUMENTS

| | | | |
|---|---|---|---|
| 2020/0244837 A1* | 7/2020 | Tsukahara | H04N 1/00013 |
| 2020/0252513 A1* | 8/2020 | Nakada | H04N 1/00779 |
| 2020/0296255 A1* | 9/2020 | Hashimoto | H04N 1/00718 |
| 2020/0336615 A1* | 10/2020 | Ono | G06V 10/243 |
| 2021/0075933 A1* | 3/2021 | Morikawa | H04N 1/00748 |
| 2023/0156126 A1* | 5/2023 | Hirao | H04N 1/00018 |
| | | | 358/474 |

FOREIGN PATENT DOCUMENTS

| | | |
|---|---|---|
| JP | 2020-123940 | 8/2020 |
| JP | 2020-149148 | 9/2020 |
| JP | 2021-141435 | 9/2021 |

* cited by examiner

*Primary Examiner* — Andrae S Allison
(74) *Attorney, Agent, or Firm* — Duft & Bornsen, PC

(57) ABSTRACT

An image processing apparatus is to: detect a first edge point group comprising a set of edge points between a document background area and a document area in a read image of a document; calculate feature amounts from a plurality of edge points in the first edge point group and compose an edge point feature amount group; calculate a distribution of the feature amounts of the plurality of edge points from the edge point feature amount group and calculate a feature amount corresponding to a maximum distribution; select edge points corresponding to the maximum distribution from the first edge point group and select a second edge point group using a range of the feature amount corresponding to the maximum distribution; and calculate an edge straight line approximating the second edge point group.

14 Claims, 14 Drawing Sheets

FIG.4

DOCUMENT

92

7

READING LINE

FIG.6

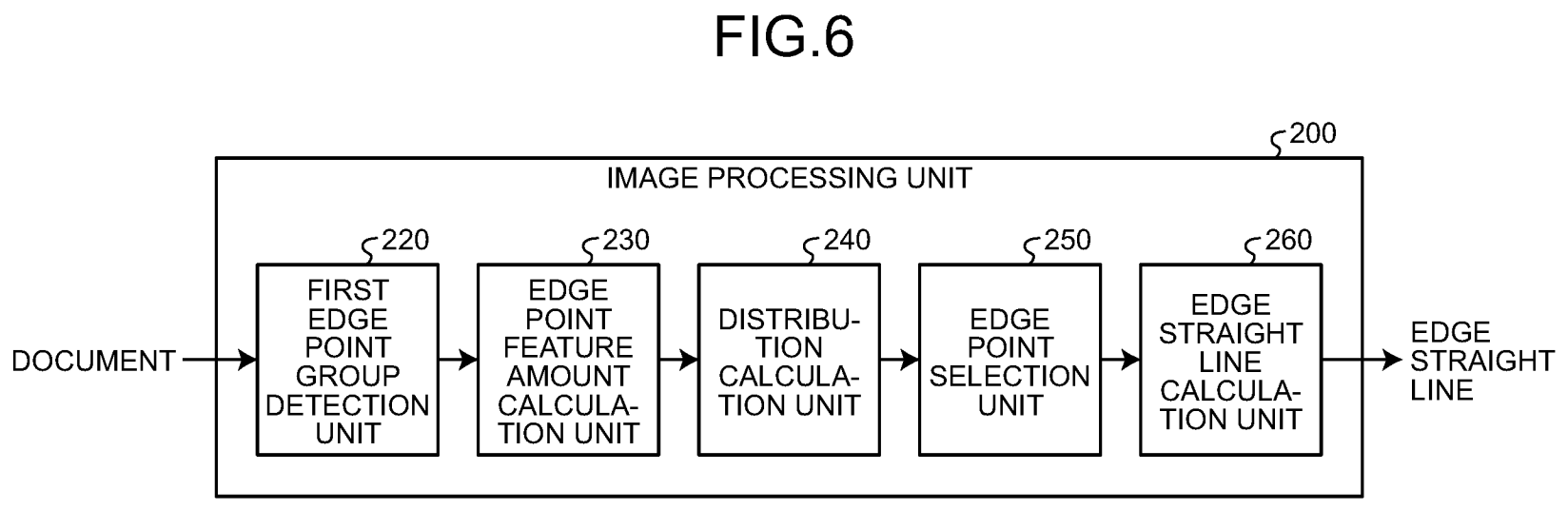

IMAGE PROCESSING UNIT 200

DOCUMENT →

220 FIRST EDGE POINT GROUP DETECTION UNIT

230 EDGE POINT FEATURE AMOUNT CALCULATION UNIT

240 DISTRIBUTION CALCULATION UNIT

250 EDGE POINT SELECTION UNIT

260 EDGE STRAIGHT LINE CALCULATION UNIT

→ EDGE STRAIGHT LINE

START

DETECT EDGE POINT GROUP `S1`

CALCULATE FEATURE AMOUNTS OF EDGE POINTS `S2`

CALCULATE DISTRIBUTION `S3`

SELECT EDGE POINTS `S4`

CALCULATE EDGE STRAIGHT LINE `S5`

END

DOCUMENT     FIRST EDGE POINT
(EDGE BETWEEN DOCUMENT BACKGROUND AREA
AND DOCUMENT AREA)

$P_n (x_n, y_n)$    $P_{n+1} (x_{n+1}, y_{n+1})$    DOCUMENT

M=0.5    M=0    M=-∞

M=∞    DOCUMENT

DOCUMENT

FEATURE AMOUNT:
INCLINATIONS ARE SAME
FEATURE AMOUNT:
Y INTERCEPTS ARE DIFFERENT

1 DEGREE WIDTH FREQUENCY DISTRIBUTION

10 DEGREE WIDTH FREQUENCY DISTRIBUTION

DOCUMENT

IMAGE PROCESSING APPARATUS, IMAGE READING DEVICE, IMAGE FORMING APPARATUS, AND IMAGE PROCESSING METHOD

CROSS-REFERENCE TO RELATED APPLICATIONS

The present application claims priority under 35 U.S.C. § 119 to Japanese Patent Application No. 2023-068123, filed on Apr. 18, 2023. The contents of which are incorporated herein by reference in their entirety.

BACKGROUND OF THE INVENTION

1. Field of the Invention

The present invention relates to an image processing apparatus, an image reading device, an image forming apparatus, and an image processing method.

2. Description of the Related Art

Conventionally, there is known an electric skew correction technique for correcting document skew and main/sub registration misalignment during ADF reading by image processing based on a skew angle and a registration position detected from a read image of an auto document feeder (ADF).

Japanese Unexamined Patent Application Publication No. 2020-149148 discloses a technique for detecting an edge of a document by excluding a point largely away from a median value of a sub-scanning direction position as noise, with the aim of improving the accuracy of edge detection of the document in skew correction.

Meanwhile, in recent years, it is desired to correctly detect a document edge even for a document having damage such as waviness, folding, or curl.

However, according to the technique disclosed in Japanese Unexamined Patent Application Publication No. 2020-149148, a point away from the median value of the sub-scanning direction coordinates is removed to extract an edge point for linear equation calculation, but an edge point of a damaged portion such as waviness, folding, or curl is also used for linear equation calculation, and thus an error occurs in the edge straight line.

SUMMARY OF THE INVENTION

According to an aspect of the present invention, an image processing apparatus includes a first edge point group detection unit, an edge point feature amount calculation unit, a distribution calculation unit, an edge point selection unit, and an edge straight line calculation unit. The first edge point group detection unit is configured to detect a first edge point group comprising a set of edge points between a document background area and a document area in a read image of a document, the read image being output from an imaging unit. The edge point feature amount calculation unit is configured to calculate feature amounts from a plurality of edge points in the first edge point group and compose an edge point feature amount group. The distribution calculation unit is configure to calculate a distribution of the feature amounts of the plurality of edge points from the edge point feature amount group and calculate a feature amount corresponding to a maximum distribution. The edge point selection unit is configured to select edge points corresponding to the maximum distribution from the first edge point group and select a second edge point group using a range of the feature amount corresponding to the maximum distribution calculated by the distribution calculation unit. The edge straight line calculation unit is configured to calculate an edge straight line approximating the second edge point group.

BRIEF DESCRIPTION OF THE DRAWINGS

FIG. 4 is a diagram schematically illustrating a configuration in the vicinity of a document reading position;

FIG. 6 is a block diagram illustrating a function of an image processing unit;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
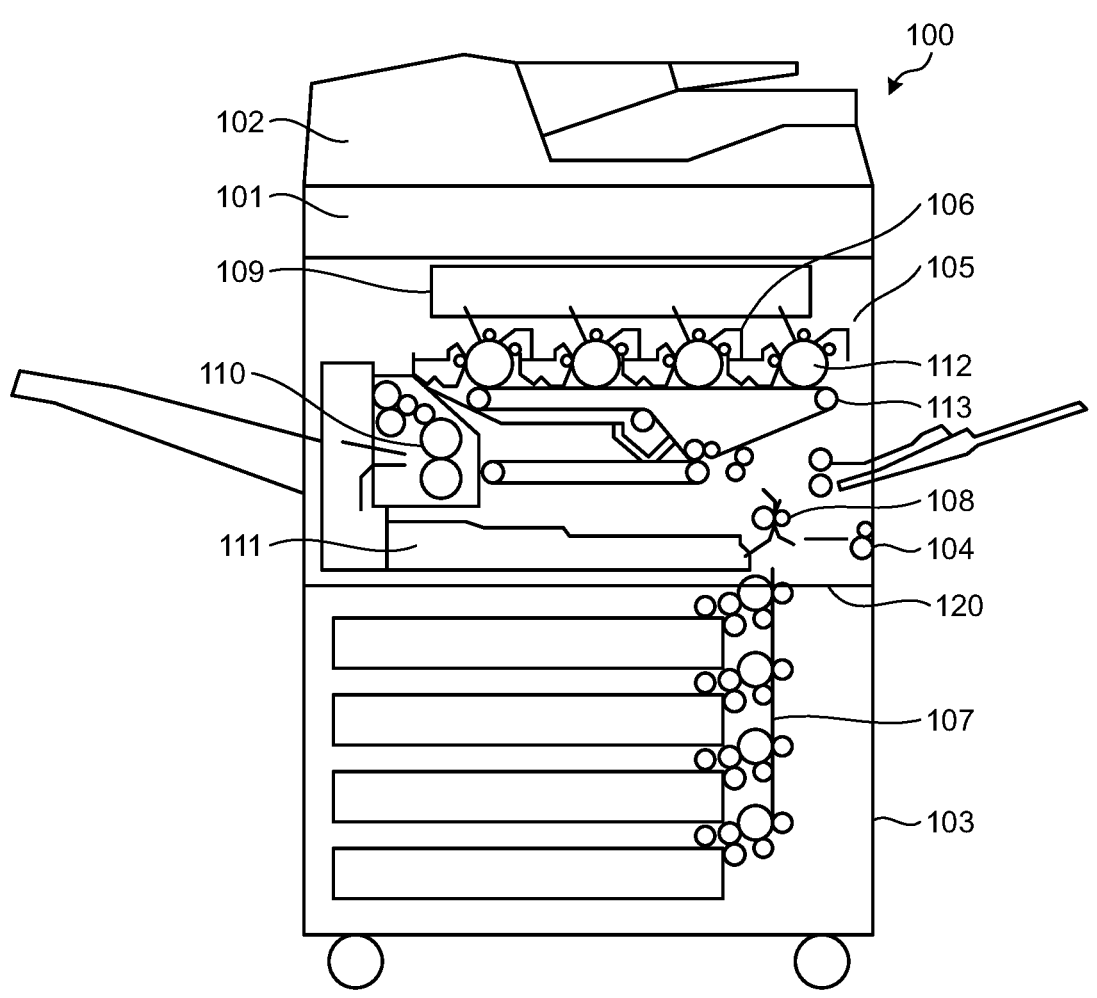
FIG. 1 is a cross-sectional view schematically illustrating a schematic configuration of an image forming apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to improve edge detection accuracy even for a damaged document.

Hereinafter, embodiments of an image processing apparatus, an image reading device, an image forming apparatus, and an image processing method will be described in detail with reference to the accompanying drawings.

First Embodiment

FIG. 1 is a cross-sectional view schematically illustrating a schematic configuration of an image forming apparatus 100 according to a first embodiment. The image forming apparatus 100 is a multifunction peripheral having at least two functions of a copy function, a printer function, a scanner function, and a facsimile function.

As illustrated in FIG. 1, the image forming apparatus 100 includes a sheet feeding unit 103, an apparatus main body 104, a scanner 101 constituting an image reading device, and an auto document feeder (ADF) 102.

The image forming apparatus 100 includes a plotter 120 as an image forming unit in the apparatus main body 104. The plotter 120 includes a tandem system image forming unit 105, a registration roller 108 that supplies a recording sheet from the sheet feeding unit 103 to the image forming unit 105 via a conveyance path 107, an optical writing device 109, a fixing unit 110, and a double-sided tray 111.

In the image forming unit 105, four photoconductor drums 112 corresponding to four colors of yellow (Y), magenta (M), cyan (C), and black (key plate (K)) are arranged in parallel. An image forming element including a charger, a developing device 106, a transfer device, a cleaner, and a neutralizer is disposed around each photoconductor drum 112.

In addition, an intermediate transfer belt 113 stretched between a driving roller and a driven roller in a state of being sandwiched between the nip between the transfer device and the photoconductor drum 112 is disposed between the transfer device and the photoconductor drum 112.

The tandem system image forming apparatus 100 configured as described above performs optical writing from the optical writing device 109 to the photoconductor drums 112 corresponding to the respective colors for each color of Y, M, C, and K based on a document image obtained by reading a document that is a detection target sent from the ADF 102 by the scanner 101, develops for each toner of each color by the developing device 106, and primarily transfers the toner to the intermediate transfer belt 113 in the order of Y, M, C, and K, for example. Then, the image forming apparatus 100 secondarily transfers a full-color image superimposed in four colors by the primary transfer onto the recording sheet supplied from the sheet feeding unit 103, and then fixes the full-color image by the fixing unit 110 and ejects the recording sheet to form the full-color image on the recording sheet.

Next, the scanner 101 will be described.

Figure 2:
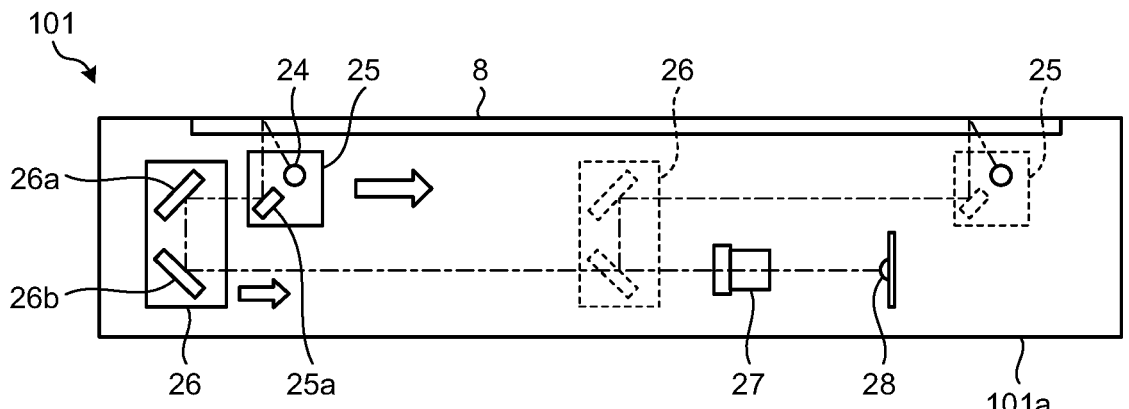
FIG. 2 is a cross-sectional view schematically illustrating a schematic configuration of a scanner.

FIG. 2 is a cross-sectional view schematically illustrating a schematic configuration of the scanner 101. As illustrated in FIG. 2, the scanner 101 includes a first carriage 25, a second carriage 26, an imaging forming lens 27, and an imaging unit 28 as an imaging means, and these constituent members are disposed inside a main body frame 101a of the scanner 101.

Further, a first rail and a second rail not illustrated are provided inside the main body frame 101a of the scanner 101 so as to extend in the sub-scanning direction (left-right direction in FIG. 2). The first rail includes two rails arranged at a predetermined interval in the main-scanning direction orthogonal to the sub-scanning direction. The second rail has the same configuration as the first rail.

The first carriage 25 is slidably attached to the first rail, and is configured to be able to reciprocate between a position indicated by a solid line and a position indicated by a broken line in FIG. 2 in the sub-scanning direction via a first carriage drive wire (not illustrated) by a drive motor (not illustrated). The first carriage 25 is provided with a light source 24 and a first mirror member 25a.

In addition, the second carriage 26 is slidably attached to the second rail, and is configured to be able to reciprocate between a position indicated by a solid line and a position indicated by a broken line in FIG. 2 in the sub-scanning direction via a second carriage drive wire (not illustrated) by a drive motor (not illustrated). The second carriage 26 is provided with a second mirror member 26a and a third mirror member 26b.

Here, the first carriage 25 and the second carriage 26 move in the sub-scanning direction at a speed ratio of 2:1. Due to such a relationship of the moving speed, even when the first carriage 25 and the second carriage 26 move, an optical path length of light from a document surface to the imaging forming lens 27 does not change.

The imaging forming lens 27 condenses and forms an image on the imaging unit 28 with reflected light from the document incident via each mirror member. The imaging unit 28 includes an imaging element such as a CCD, photoelectrically converts a reflected light image of a document formed via the imaging forming lens 27, and outputs an analog image signal that is a read image.

Next, the ADF 102 mounted on the scanner 101 will be described.

Figure 3:
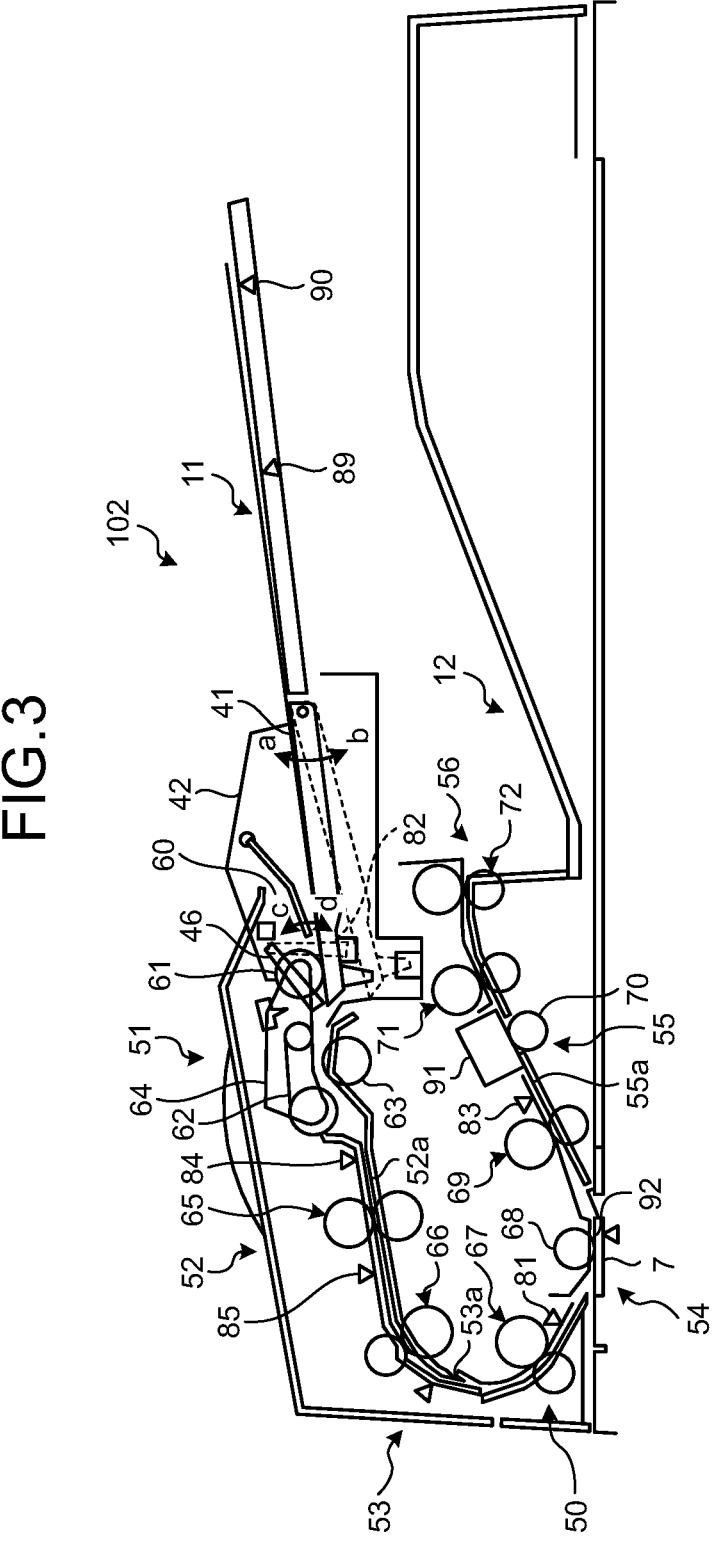
FIG. 3 is a cross-sectional view schematically illustrating a schematic configuration of an ADF.

FIG. 3 is a cross-sectional view schematically illustrating a schematic configuration of the ADF 102.

As illustrated in FIG. 3, the ADF 102 includes a document tray 11 on which a document is placed. The document tray 11 includes a movable document table 41 that rotates in the directions of a and b in the drawing with a base end portion as a fulcrum, and a pair of side guide plates 42 that position the left-right direction with respect to the sheet feeding direction. A front end portion of the document in the feeding direction is adjusted to an appropriate height by the rotation of the movable document table 41.

Further, in the document tray 11, document length detection sensors 89 and 90 that detect whether the orientation of the document is vertical or horizontal are provided separately in the feeding direction. Note that, as the document length detection sensors 89 and 90, a reflection type sensor that performs detection in a non-contact manner by an optical means or a contact type actuator type sensor may be used.

One side of the pair of side guide plates 42 is slidable in the left-right direction with respect to the sheet feeding direction, and documents having different sizes can be placed thereon.

On the fixed side of the pair of side guide plates 42, a set filler 46 that rotates when the document is placed is provided. In addition, a document set sensor 82 that detects that a document is placed on the document tray 11 is provided at a lowermost portion on a movement trajectory of a tip portion of the set filler 46. That is, the document set sensor 82 detects the presence or absence of the document set in the ADF 102 based on whether or not the set filler 46 has rotated and detached from the document set sensor 82.

The ADF 102 includes a conveyance unit 50 including a separation feeding unit 51, a pull-out unit 52, a turn unit 53, a first reading conveyance unit 54, a second reading conveyance unit 55, and a sheet ejection unit 56. Each conveyance roller of the conveyance unit 50 is rotationally driven by one or more conveyance motors.

The separation feeding unit 51 includes a pickup roller 61 arranged in the vicinity of a sheet feeding port 60 for feeding a document, and a sheet feeding belt 62 and a reverse roller 63 arranged to face each other across a conveyance path.

The pickup roller 61 is supported by a support arm member 64 attached to the sheet feeding belt 62, and moves up and down in directions c and d in the drawing between a contact position in contact with a document bundle and a separation position away from the document bundle via a cam mechanism (not illustrated). The pickup roller 61 picks up several (ideally one) documents out of the documents stacked on the document tray 11 at the contact position.

The sheet feeding belt 62 rotates in the feeding direction, and the reverse roller 63 rotates in the direction opposite to the feeding direction. In addition, the reverse roller 63 rotates in the reverse direction with respect to the sheet feeding belt 62 in a case where the documents are double-fed. However, in a case where the reverse roller 63 is in contact with the sheet feeding belt 62 or in a case where only one document is conveyed, the reverse roller rotates together with the sheet feeding belt 62 by the action of a torque limiter (not illustrated). Accordingly, double feeding of the documents is prevented.

The pull-out unit 52 includes a pull-out roller 65 including a pair of rollers arranged so as to sandwich a conveyance path 52*a*. The pull-out unit 52 performs primary abutting alignment (so-called skew correction) on the sent document according to the drive timing of the pull-out roller 65 and the pickup roller 61, and pulls out and conveys the document after alignment.

The turn unit 53 includes an intermediate roller 66 and a reading entrance roller 67 each including a pair of rollers disposed so as to sandwich a conveyance path 53*a* curved from the top to the bottom. The turn unit 53 turns the document drawn and conveyed by the intermediate roller 66 by conveying the document on a curved conveyance path, and conveys the document to the vicinity of a slit glass 7, which is a document reading position (imaging position), with the front face of the document facing downward by the reading entrance roller 67.

Here, a conveyance speed of the document from the pull-out unit 52 to the turn unit 53 is set to be higher than a conveyance speed in the first reading conveyance unit 54. Accordingly, a conveyance time of the document conveyed to the first reading conveyance unit 54 is shortened.

The first reading conveyance unit 54 includes a first reading roller 68 disposed to face the slit glass 7 and a first reading exit roller 69 disposed on a conveyance path 55*a* after the reading is completed. The first reading conveyance unit 54 conveys the surface of the document conveyed to the vicinity of the slit glass 7 while bringing the surface into contact with the slit glass 7 by the first reading roller 68. In this case, the document is read by the scanner 101 via the slit glass 7. At this time, the first carriage 25 and the second carriage 26 of the scanner 101 are stopped at the home positions. The first reading conveyance unit 54 further conveys the document after the reading is completed by the first reading exit roller 69.

Figure 4:
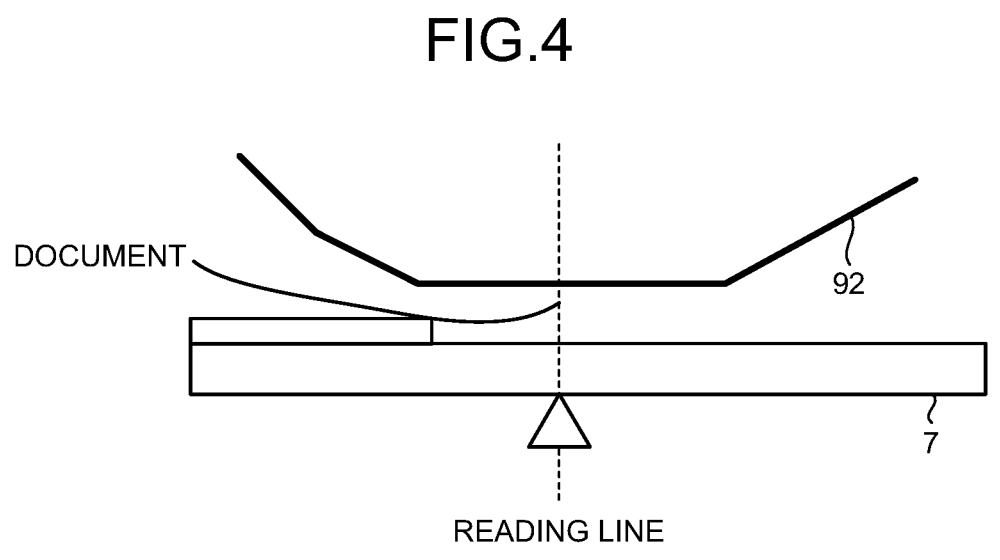

Here, FIG. 4 is a diagram schematically illustrating a configuration in the vicinity of a document reading position. In FIG. 4, the document is conveyed from left to right.

As illustrated in FIG. 4, the ADF 102 includes a background member 92 serving as an imaging background at a position facing the slit glass 7. The background member 92 is, for example, a white member having a uniformly high reflectance in a visible light region, and is used for shading correction. The document is conveyed between the slit glass 7 and the background member 92. The scanner 101 reads an image at a position of a reading line illustrated in FIG. 4.

The second reading conveyance unit 55 includes a second reading unit 91 that reads the back surface of the document, a second reading roller 70 disposed to face the second reading unit 91 across the conveyance path 55*a*, and a second reading exit roller 71 disposed downstream of the second reading unit 91 in the conveyance direction.

In the second reading conveyance unit 55, the back surface of the document after the front surface reading is read by the second reading unit 91. The document whose back surface has been read is conveyed toward the sheet ejection port by the second reading exit roller 71. The second reading roller 70 suppresses floating of the document in the second reading unit 91 and also serves as a reference white portion for acquiring shading data in the second reading unit 91. In a case where the double-sided reading is not performed, the document passes through the second reading unit 91.

The sheet ejection unit 56 is provided with a pair of sheet ejection rollers 72 in the vicinity of the sheet ejection port, and ejects the document conveyed by the second reading exit roller 71 to a sheet ejection tray 12.

In addition, the ADF 102 is provided with various sensors such as an abutment sensor 84, a registration sensor 81, and a sheet ejection sensor 83 along a conveyance path, and is used for conveyance control such as a conveyance distance and a conveyance speed of a document.

Further, a document width sensor 85 is provided between the pull-out roller 65 and the intermediate roller 66. Note that the length of the document in the conveyance direction is detected from the motor pulse by reading the front end and the rear end of the document by the abutment sensor 84 and the registration sensor 81.

Next, a hardware configuration of the image forming apparatus 100 will be described.

Figure 5:
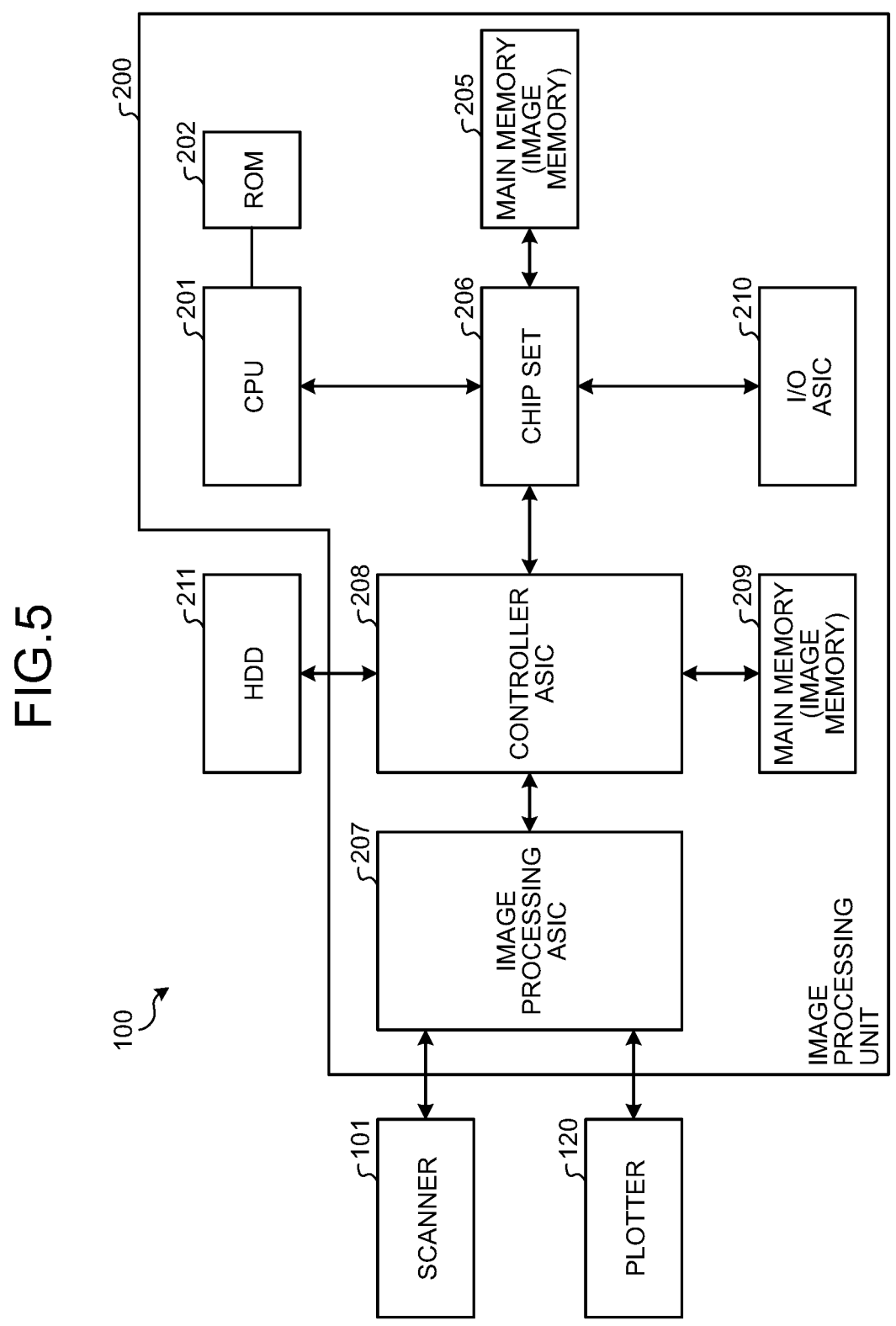
FIG. 5 is a block diagram illustrating a hardware configuration of the image forming apparatus.

Here, FIG. 5 is a block diagram illustrating a hardware configuration of the image forming apparatus 100. As illustrated in FIG. 5, the image forming apparatus 100 includes an image processing unit 200 that is an image processing apparatus that performs predetermined processing on a document image read by the scanner 101 and outputs the processed document image as image data to the plotter 120.

The image processing unit 200 includes a central processing unit (CPU) 201, a read only memory (ROM) 202, a main memory 205, a chip set 206, an image processing ASIC 207, a controller ASIC 208, a main memory 209, and an I/O ASIC 210. ASIC is an abbreviation for Application Specific Integrated Circuit.

The CPU 201 is for controlling the image forming apparatus 100. The main memory 205 is used as a work area in which a program for the CPU 201 to control the image forming apparatus 100 is developed, and temporarily stores image data to be handled (image memory). The chip set 206 is used together with the CPU 201 to control the controller ASIC 208 and the I/O ASIC 210 to access the main memory 205.

The program executed by the image forming apparatus 100 according to the present embodiment may be provided by being recorded in a computer-readable recording medium such as a CD-ROM, a flexible disk (FD), a CD-R, or a digital versatile disc (DVD) as a file in an installable format or an executable format.

Furthermore, the program executed by the image forming apparatus 100 of the present embodiment may be stored on a computer connected to a network such as the Internet and provided by being downloaded via the network. In addition, the program executed by the image forming apparatus 100 of the present embodiment may be provided or distributed via a network such as the Internet.

The scanner 101 has a function of reading image data to be copied or image data to be output to an external interface. The plotter 120 has a function for printing image data subjected to image processing by the controller ASIC 208.

The image processing ASIC 207 performs image processing on the image data read by the scanner 101 and outputs the image data to the controller ASIC 208. In addition, the image processing ASIC 207 performs image processing so that the image data from the controller ASIC 208 can be printed by the plotter 120, and sends the image data in accordance with the print timing of the plotter 120.

The controller ASIC 208 rotates and edits image data handled by the image forming apparatus 100 using the main memory 205 over the chip set 206, accumulates the image data in an HDD 211, and transmits and receives the image data to and from the image processing ASIC 207. The main memory 209 is used as an image memory in which the controller ASIC 208 performs image processing. A hard disk drive (HDD) 211 is used to temporarily store image data subjected to image processing.

The I/O ASIC 210 is an external interface for giving an additional function to the image forming apparatus 100. For example, the I/O ASIC 210 includes a network interface, a USB, an SD card, an operation unit, an interface such as SPI, I2C, or the document width sensor 85, a hardware accelerator for speeding up image processing, an encryption processing circuit, and the like.

Next, functions exerted by the image processing unit 200 will be described.

Here, FIG. 6 is a block diagram illustrating functions of the image processing unit 200. Note that, here, among the functions exhibited by the image processing unit 200, characteristic functions in the present embodiment will be described.

As illustrated in FIG. 6, the image processing unit 200 includes a first edge point group detection unit 220, an edge point feature amount calculation unit 230, a distribution calculation unit 240, an edge point selection unit 250, and an edge straight line calculation unit 260. In the present embodiment, the controller ASIC 208 includes a first edge point group detection unit 220, an edge point feature amount calculation unit 230, a distribution calculation unit 240, an edge point selection unit 250, and an edge straight line calculation unit 260. Note that the present invention is not limited thereto, and the first edge point group detection unit 220, the edge point feature amount calculation unit 230, the distribution calculation unit 240, the edge point selection unit 250, and the edge straight line calculation unit 260 may be realized by the CPU 201 executing a program.

The first edge point group detection unit 220 detects a first edge point group that is a set of edge points between a document background area and a document area in the read image data of the read document.

The edge point feature amount calculation unit 230 calculates feature amounts of edge points at all the edge points of the first edge point group detected by the first edge point group detection unit 220 to compose an edge point feature amount group.

The distribution calculation unit 240 calculates the distribution of the feature amount of each edge point from the edge point feature amount group calculated by the edge point feature amount calculation unit 230, and calculates the feature amount corresponding to the maximum distribution.

The edge point selection unit 250 selects the edge points corresponding to the maximum distribution from the first edge point group and selects the second edge point group using the range of the feature amount corresponding to the maximum distribution calculated by the distribution calculation unit 240.

The edge straight line calculation unit 260 obtains an edge straight line approximating the second edge point group using the second edge point group selected by the edge point selection unit 250.

Figure 7:
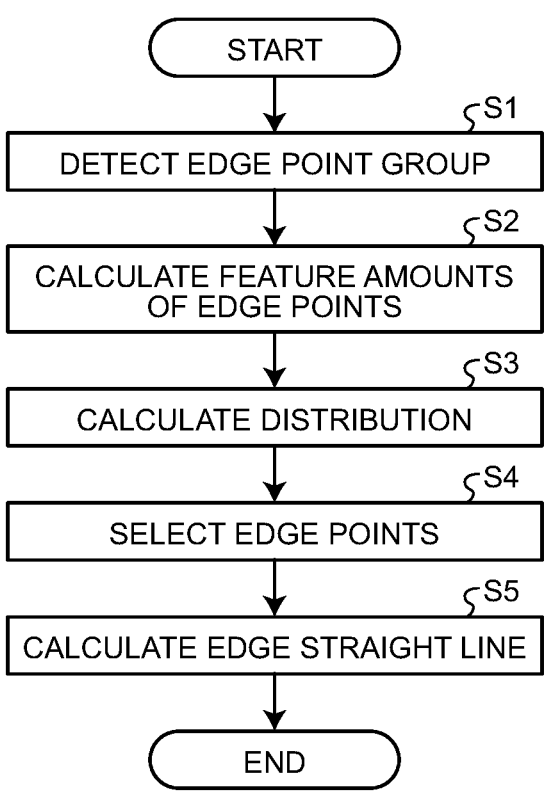
FIG. 7 is a flowchart illustrating a flow of edge straight line calculation processing.

Here, FIG. 7 is a flowchart illustrating a flow of edge straight line calculation processing.

As illustrated in FIG. 7, first, the first edge point group detection unit 220 detects the first edge point group that is a set of edge points between the document background area and the document area of image data including a document read from the scanner 101 (Step S1).

Figure 8:
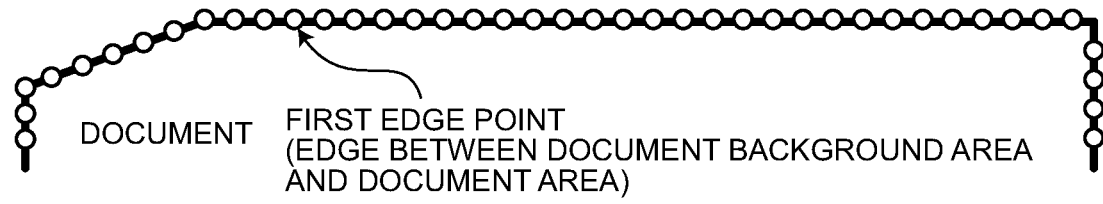
FIG. 8 is a diagram illustrating a detection example of an edge point.

Here, FIG. 8 is a diagram illustrating a detection example of an edge point. As illustrated in FIG. 8, the first edge point group detection unit 220 also detects an edge point (an edge point between the document background area and the document area) in a damaged portion such as folding.

Next, the edge point feature amount calculation unit 230 calculates feature amounts of edge points at all the edge points of the first edge point group detected by the first edge point group detection unit 220 in Step S1, and composes the edge point feature amount group (Step S2).

Figure 9:
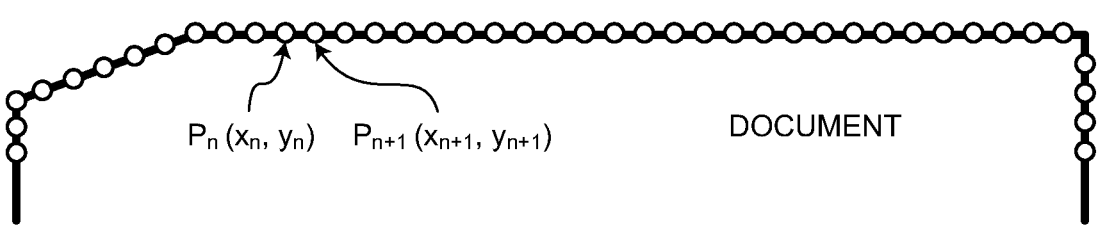
FIG. 9 is a diagram illustrating a calculation example of a feature amount of an edge point.

Here, FIG. 9 is a diagram illustrating a calculation example of the feature amount of the edge point. As illustrated in FIG. 9, the edge point feature amount calculation unit 230 calculates an inclination $M_n$ between two successive points $P_n(x_n, y_n)$ and $P_{n+1}(x_{n+1}, y_{n+1})$ as an example of the feature amount.

$$M_n = (y_{n+1} - y_n)/(x_{n+1} - x_n)$$

Figure 10:
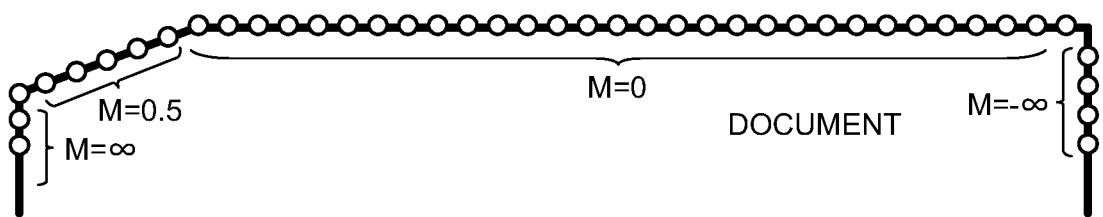
FIG. 10 is a diagram illustrating an inclination example of each edge point.

Here, FIG. 10 is a diagram illustrating an inclination example of each edge point. In the example illustrated in FIG. 10, the inclination M of the portion orthogonal to the conveyance direction of the document is 0, and the inclination M of the portion parallel to the conveyance direction of the document is ∞. Meanwhile, as illustrated in FIG. 10, the inclination M of the damaged portion such as the folding is 0.5.

Subsequently, the distribution calculation unit 240 calculates the distribution of the feature amount of each edge point from the edge point feature amount group calculated by the edge point feature amount calculation unit 230 in Step S2, and calculates the feature amount corresponding to the maximum distribution (Step S3).

Figure 11:
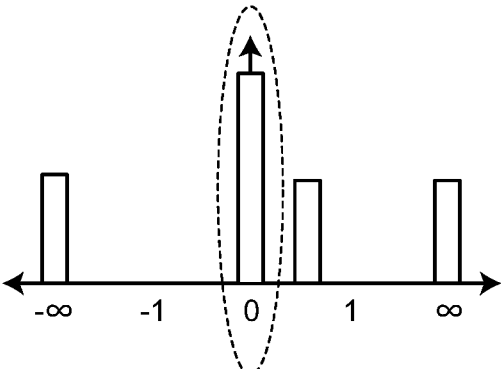
FIG. 11 is a diagram illustrating a distribution example of the feature amount of each edge point.

Here, FIG. 11 is a diagram illustrating a distribution example of the feature amount of each edge point. As illustrated in FIG. 11, according to the distribution of the feature amounts of the edge points illustrated in FIG. 10, the distribution calculation unit 240 calculates the inclination M=0 illustrated in FIG. 10 as the feature amount corresponding to the maximum distribution.

Subsequently, the edge point selection unit 250 selects the edge points corresponding to the maximum distribution from the first edge point group and select the second edge point group using the range of the feature amount corresponding to the maximum distribution calculated by the distribution calculation unit 240 (Step S4).

Figure 12:
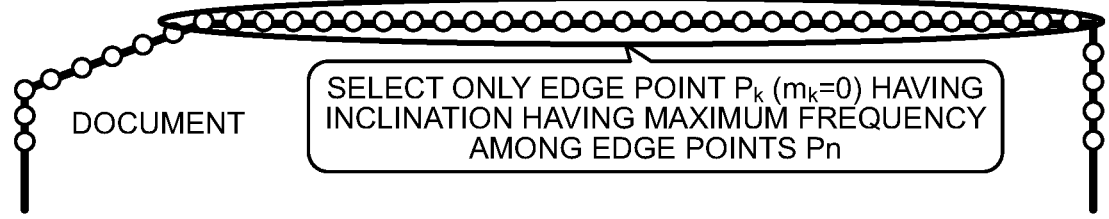
FIG. 12 is a diagram illustrating an example of a selected edge point.

Here, FIG. 12 is a diagram illustrating an example of the selected edge point. As illustrated in FIG. 12, the edge point selection unit 250 selects the edge point $P_k$ ($M_k$=0) having the inclination having the maximum frequency among the edge points $P_n$.

Subsequently, the edge straight line calculation unit 260 obtains an edge straight line approximating the second edge point group using the second edge point group that is a set of the edge points $P_k$ ($m_k$=0 points) selected by the edge point selection unit 250 (Step S5), and ends the processing. The edge straight line calculation unit 260 obtains a linear expression (y=mx+Y) of the edge straight line $P_k$ ($x_k$, $y_k$) using, for example, the least squares method as illustrated in the following Expression. m represents an inclination, and Y represents an intercept.

$$a\_num = n\sum\nolimits_{i=1}^{n}x_iy_i - \sum\nolimits_{i=1}^{n}x_i\sum\nolimits_{i=1}^{n}y_i$$

$$b\_num = \sum\nolimits_{i=1}^{n}x_i^2\sum\nolimits_{i=1}^{n}y_i - \sum\nolimits_{i=1}^{n}x_iy_i\sum\nolimits_{i=1}^{n}x_i$$

$$den = n\sum\nolimits_{i=1}^{n}x_i^2 - \left(\sum\nolimits_{i=1}^{n}x_i\right)^2$$

$$m = a\_num/den$$

$$Y = b\_num/den$$

As described above, according to the present embodiment, in a case where the edge straight line is obtained by detecting the edge point, the configuration of the edge point feature amount calculation unit 230 and the edge point selection unit 250 is provided, and thus, it is possible to calculate the edge straight line by extracting only an edge point connected to a correct edge straight line even in a document having damage such as folding. As a result, the edge detection accuracy can be improved even for a damaged document.

Second Embodiment

Next, a second embodiment will be described.

The second embodiment is different from the first embodiment in that an edge point feature amount calculation unit 230 calculates a plurality of feature amounts (inclination, Y intercept). Hereinafter, in the description of the second embodiment, description of the same parts as those of the first embodiment will be omitted, and portions different from those of the first embodiment will be described.

The edge point feature amount calculation unit 230 of the image processing unit 200 according to the second embodiment obtains not only the inclination of each edge point but also the inclination and the Y intercept as the feature amount of the edge point at all points of the edge point group detected by the first edge point group detection unit 220. That is, the edge point feature amount calculation unit 230 calculates a plurality of feature amounts (inclination, Y intercept).

In addition, the distribution calculation unit 240 of the image processing unit 200 according to the second embodiment calculates a distribution of a plurality of feature amounts (inclination, Y intercept) and calculates the feature amount corresponding to the maximum distribution.

A flow of edge straight line calculation processing will be described with reference to the flowchart of FIG. 7 illustrated in the first embodiment.

In Step S1, as in the first embodiment, the first edge point group detection unit 220 detects the edge point group between the document background area and the document area of image data including the document read from the scanner 101.

Figure 13:
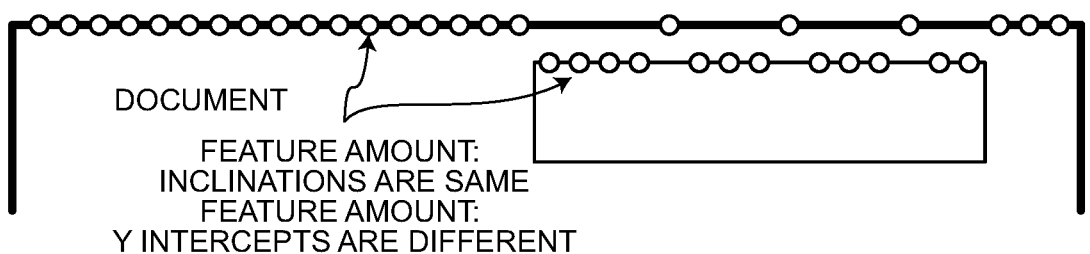
FIG. 13 is a diagram illustrating a detection example of an edge point in a first edge point group detection unit according to the second embodiment.

Here, FIG. 13 is a diagram illustrating an example of detection of edge points in the first edge point group detection unit 220 of the image processing unit 200 according to the second embodiment. In the example illustrated in FIG. 13, there are many noises in the vicinity of the edge points detected by the first edge point group detection unit 220, and edge point groups have the same inclination but different Y intercept are detected.

In Step S2, the edge point feature amount calculation unit 230 calculates the feature amount of the edge points at all the points of the edge point group detected by the first edge point group detection unit 220 in Step S1. In the present embodiment, the edge point feature amount calculation unit 230 calculates a feature amount 1 (inclination ($M_n$)) and a feature amount 2 (Y intercept ($y_n$)) (see Table 1).

$$M_n = (y_{n+1} - y_n)/(x_{n+1} - x_n)$$

$$Y_n = M_n * X_n + Y_n$$

TABLE 1

| Distribution | | Feature amount 1: inclination | | | | |
| | | −1.0 or less | −1.0 to −0.5 | −0.5 to 0.5 | 0.5 to 1.0 | 1.0 or more |
|---|---|---|---|---|---|---|
| Feature amount 2: Y intercept | −100 or less | 5 | 3 | 2 | 4 | 3 |
| | −100 to 0 | 3 | 1 | 0 | 0 | 2 |
| | 0 to 100 | 2 | 4 | 1 | 2 | 3 |
| | 100 to 200 | 5 | 2 | 70 | 4 | 3 |
| | 200 or more | 6 | 8 | 1 | 2 | 4 |

In Step S3, the distribution calculation unit 240 calculates a distribution of a plurality of feature amounts of the edge points calculated by the edge point feature amount calculation unit 230 in Step S2, and calculates a feature amount corresponding to the maximum distribution.

Figure 14:
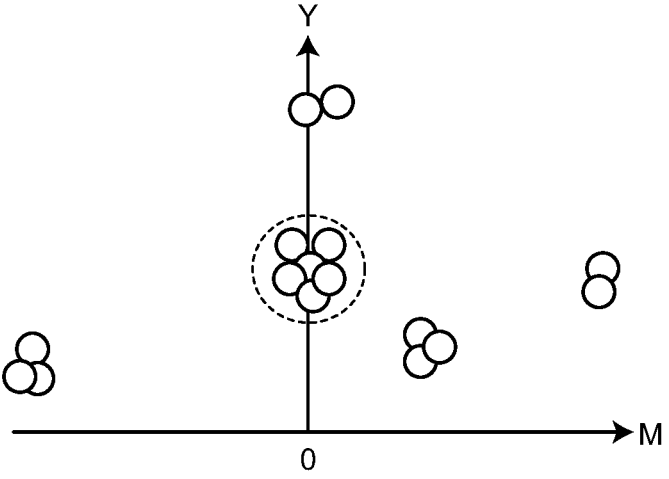
FIG. 14 is a diagram illustrating a distribution example of a plurality of feature amounts of each edge point.

Here, FIG. 14 is a diagram illustrating a distribution example of a plurality of feature amounts of the edge points. As illustrated in FIG. 14, according to the distribution of the plurality of feature amounts (inclination ($M_n$), Y Intercept ($y_n$)) of edge points illustrated in FIG. 13, the distribution calculation unit 240 calculates the inclination M=−0.5 to 0.5 and Y=100 to 200 illustrated in Table 1 as the feature amounts corresponding to the maximum distribution.

Note that the distribution calculation unit 240 may calculate the maximum distribution by obtaining a one-dimensional distribution with the feature amount 1 (inclination $(M_n)$) and then obtain the maximum distribution again with the feature amount 2 (Y intercept $(y_n)$).

Since Steps S4 to S5 are the same processes as those of the first embodiment, the description thereof will be omitted here.

As described above, according to the present embodiment, the edge point feature amount calculation unit 230 calculates the plurality of feature amounts (inclination, Y intercept), so that it is possible to correctly calculate an edge straight line even when there is a lot of noise in the vicinity of the edge point detected by the first edge point group detection unit 220.

Third Embodiment

Next, a third embodiment will be described.

The third embodiment is different from the first embodiment in that the distribution calculation unit 240 creates a plurality of distributions of feature amounts. Hereinafter, in the description of the third embodiment, description of the same parts as those of the first embodiment will be omitted, and portions different from those of the first embodiment will be described.

The distribution calculation unit 240 of the image processing unit 200 according to the third embodiment calculates a plurality of distributions and obtains a plurality of maximum distributions.

A flow of edge straight line calculation processing will be described with reference to the flowchart of FIG. 7 illustrated in the first embodiment.

In Step S1, as in the first embodiment, the first edge point group detection unit 220 detects the first edge point group that is the set of edge points between the document background area and the document area of image data including the document read from the scanner 101.

In Step S2, similarly to the first embodiment, the edge point feature amount calculation unit 230 calculates feature amounts of edge points at all edge points of the first edge point group detected by the first edge point group detection unit 220 in Step S1, and composes the edge point feature amount group.

In the subsequent Step S3, the distribution calculation unit 240 creates a plurality of distributions of the feature amounts of each edge point from the edge point feature amount group calculated by the edge point feature amount calculation unit 230 in Step S2, and calculates the feature amount corresponding to the maximum distribution. More specifically, the distribution calculation unit 240 calculates the distribution of the feature amounts using a plurality of widths or ranges of classes.

Figure 15A:
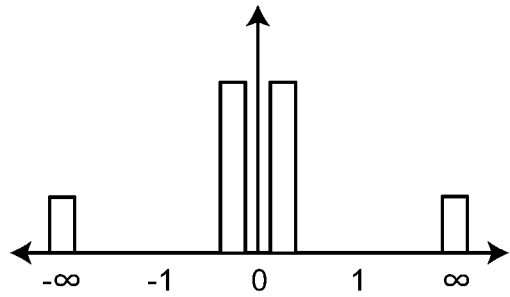
FIGS. 15A and 15B are diagrams illustrating a calculation example of a feature amount distribution of each edge point in a distribution calculation unit according to the third embodiment.
Figure 15B:
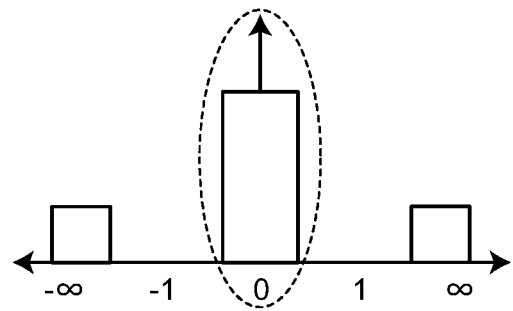

Here, FIGS. 15A and 15B are diagrams illustrating a calculation example of the feature amount distribution of each edge point in the distribution calculation unit 240 of the image processing unit 200 according to the third embodiment. In the example illustrated in FIGS. 15A and 15B, the distribution calculation unit 240 creates a distribution map of 1 degree angle width and a distribution map of 10 degree angle width when calculating the inclination $M_n$ of two successive points $P_n$ $(x_n, y_n)$ and $P_{n+1}$ $(x_{n+1}, y_{n+1})$ as an example of the feature amount.

Figure 16:
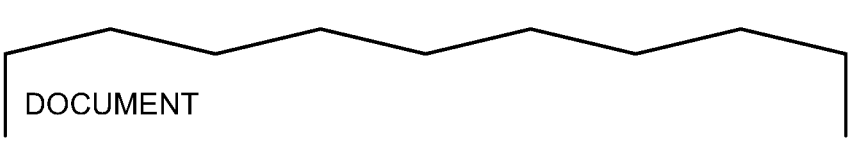
FIG. 16 is a diagram illustrating an example of a document having damage due to waviness.

Here, FIG. 16 is a diagram illustrating an example of a document having damage due to waviness. In a case where the distribution of the feature amount of each edge point calculated by the distribution calculation unit 240 is set to one in the document damaged by the waviness as illustrated in FIG. 16, for example, as illustrated in FIG. 15A, in a case where the distribution map of the feature amount of each edge point calculated by the distribution calculation unit 240 is created with 1 degree angle width, the maximum distribution map cannot be correctly calculated.

Meanwhile, in a case where the distribution of the feature amount of each edge point calculated by the distribution calculation unit 240 is two, for example, as illustrated in FIG. 15B, in a case where the distribution map of the feature amount of each edge point calculated by the distribution calculation unit 240 is created with 10 degree angle width, the maximum distribution map can be correctly calculated.

That is, as illustrated in FIGS. 15A and 15B, by preparing a plurality of distribution maps having different widths and granularities, the distribution calculation unit 240 can correctly calculate the edge straight line by correctly setting the range of the feature amount of the edge point even in the document having damage due to the waviness in which edge straight line is rattled as illustrated in FIG. 16.

Since Steps S4 to S5 are the same processes as those of the first embodiment, the description thereof will be omitted here.

As described above, according to the present embodiment, the distribution calculation unit 240 can correctly calculate the edge straight line by calculating the distribution of the feature amounts by using a plurality of widths or ranges of classes and correcting the range of the feature amounts of the edge points even in the damaged document.

Fourth Embodiment

Next, a fourth embodiment will be described.

The fourth embodiment is different from the first to third embodiments in that a skew correction unit is provided. Hereinafter, in the description of the fourth embodiment, description of the same parts as those of the first to third embodiments will be omitted, and portions different from those of the first to third embodiments will be described.

Figure 17:
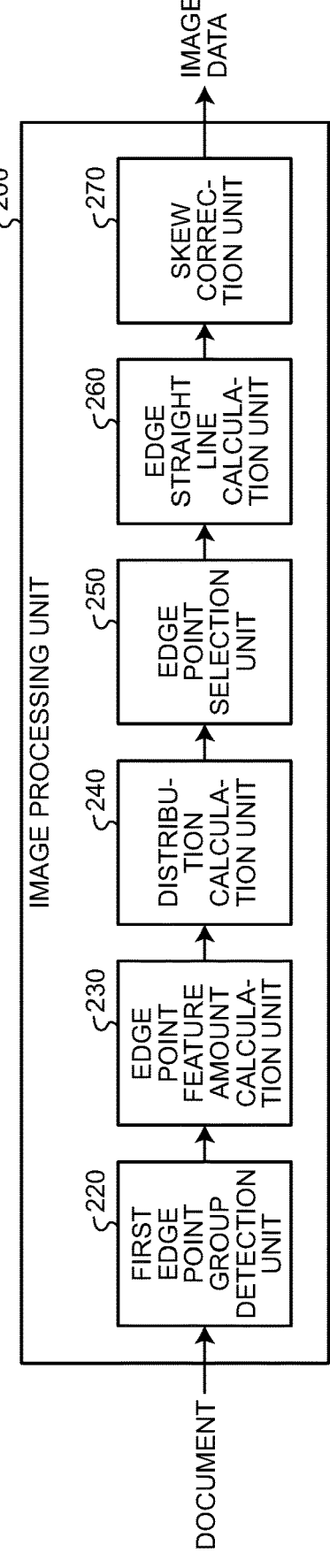
FIG. 17 is a block diagram illustrating a function of an image processing unit according to a fourth embodiment.

Here, FIG. 17 is a block diagram illustrating functions of the image processing unit 200 according to the fourth embodiment. As illustrated in FIG. 17, the image processing unit 200 includes a skew correction unit 270 in addition to the first edge point group detection unit 220, the edge point feature amount calculation unit 230, the distribution calculation unit 240, the edge point selection unit 250, and the edge straight line calculation unit 260. In the present embodiment, the controller ASIC 208 includes a skew correction unit 270. Note that the present invention is not limited thereto, and the skew correction unit 270 may be realized by the CPU 201 executing a program.

The skew correction unit 270 skew-corrects the document based on the edge straight line calculation result by the edge straight line calculation unit 260.

Figure 18:
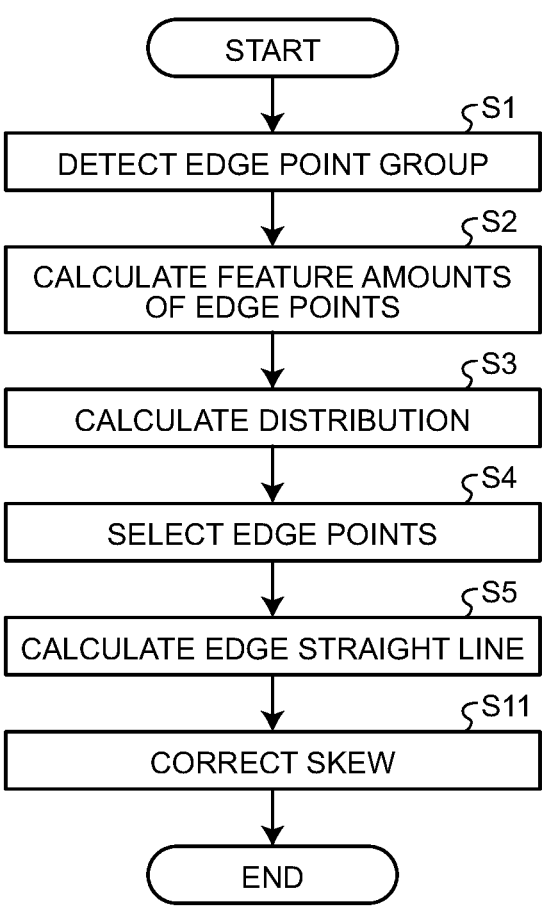
FIG. 18 is a flowchart illustrating flows of edge straight line calculation processing and skew correction processing.

Here, FIG. 18 is a flowchart illustrating flows of edge straight line calculation processing and skew correction processing.

Since Steps S1 to S5 are the same processes as those of the first embodiment, the description thereof will be omitted here.

The skew correction unit 270 calculates the inclination of the document from the edge straight line calculated by the edge straight line calculation unit 260 in Step S5. Then, the skew correction unit 270 rotates the image received as an input in a direction opposite to the inclination of the document to correct the document edge to be horizontal (Step S11), and ends the processing.

As described above, according to the present embodiment, skew correction of the document is performed based on the edge straight line calculation result, whereby skew correction can be performed with high accuracy even for a damaged document.

Fifth Embodiment

Next, a fifth embodiment will be described.

The fifth embodiment is different from the first to third embodiments in that a registration correction unit is provided. Hereinafter, in the description of the fifth embodiment, description of the same parts as those of the first to third embodiments will be omitted, and portions different from those of the first to third embodiments will be described.

Figure 19:
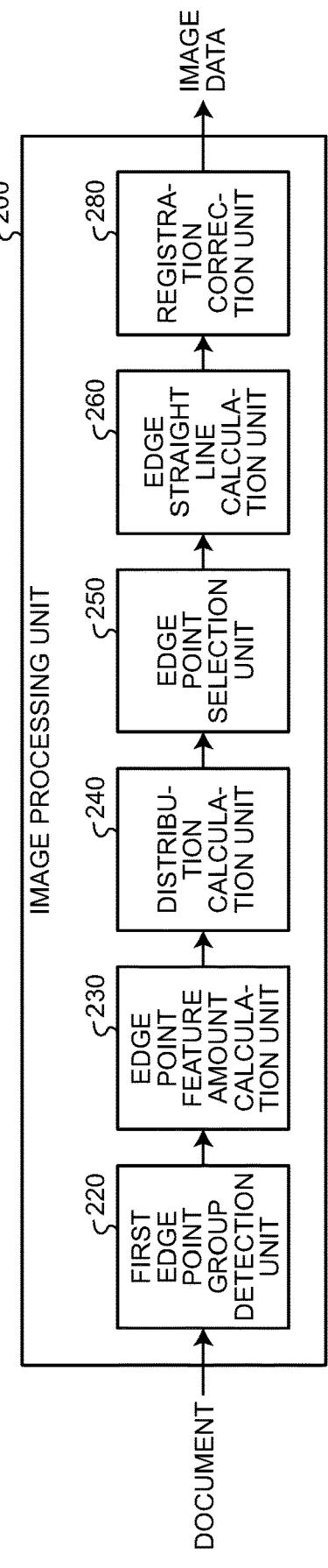
FIG. 19 is a block diagram illustrating a function of an image processing unit according to a fifth embodiment.

Here, FIG. 19 is a block diagram illustrating functions of the image processing unit 200 according to the fifth embodiment. As illustrated in FIG. 19, the image processing unit 200 includes a registration correction unit 280 in addition to the first edge point group detection unit 220, the edge point feature amount calculation unit 230, the distribution calculation unit 240, the edge point selection unit 250, and the edge straight line calculation unit 260. In the present embodiment, the controller ASIC 208 includes a registration correction unit 280. Note that the present invention is not limited thereto, and the registration correction unit 280 may be realized by the CPU 201 executing a program.

The registration correction unit 280 executes position correction processing (registration correction) of the document based on the edge straight line calculation result by the edge straight line calculation unit 260.

Figure 20:
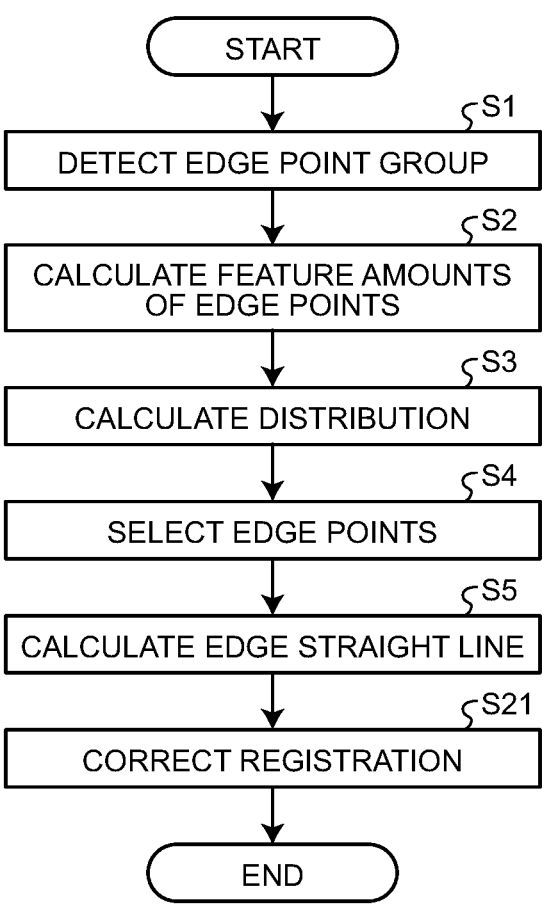
FIG. 20 is a flowchart illustrating flows of edge straight line calculation processing and registration correction processing.

Here, FIG. 20 is a flowchart illustrating flows of edge straight line calculation processing and registration correction processing.

Since Steps S1 to S5 are the same processes as those of the first embodiment, the description thereof will be omitted here.

The registration correction unit 280 calculates the upper left vertex of the document from the intersection of the edge straight lines of the upper side and the left side calculated by the edge straight line calculation unit 260 in Step S5. Then, the registration correction unit 280 performs the document position correction processing (registration correction) so that the upper left position of the image received as an input is arranged at the upper left of the output image (Step S21), and ends the processing.

As described above, according to the present embodiment, by correcting the document registration based on the edge straight line calculation result, the position correction processing (registration correction) can be executed with high accuracy even for a damaged document.

In each of the above embodiments, the boundary between the background area and the document area detected by the edge detection device is used to correct an inclination amount of the document. However, the present invention is not limited to this. The boundary between the background area and the document area detected by the edge detection device may be used for processing (trimming) of extracting only document information in the image.

In each of the above embodiments, the image forming apparatus of the present invention has been described as an example of forming an image by an electrophotography method, but the present invention is not limited thereto, and an image may be formed by an inkjet method.

In each of the above embodiments, an example in which the image forming apparatus of the present invention is applied to a multifunction peripheral having at least two functions of a copy function, a printer function, a scanner function, and a facsimile function will be described, but the present invention can be applied to any image forming apparatus such as a copier, a printer, a scanner device, and a facsimile device.

Although the embodiments of the present invention have been described above, specific configurations, processing contents, data formats, and the like of these units are not limited to those described in the embodiments. In addition, it is a matter of course that the configurations of the embodiments described above can be arbitrarily combined and implemented as long as they do not contradict each other.

An embodiment provides an advantageous effect that edge detection accuracy can be improved even for a damaged document.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:

a first edge point group detection unit configured to detect a first edge point group comprising a set of edge points between a document background area and a document area in a read image of a document, the read image being output from an imaging unit;

an edge point feature amount calculation unit configured to calculate feature amounts from a plurality of edge points in the first edge point group and compose an edge point feature amount group;

a distribution calculation unit configured to calculate a distribution of the feature amounts of the plurality of edge points from the edge point feature amount group and calculate a feature amount corresponding to a maximum distribution;

an edge point selection unit configured to select edge points corresponding to the maximum distribution from the first edge point group and select a second edge point group using a range of the feature amount corresponding to the maximum distribution calculated by the distribution calculation unit; and an edge straight line calculation unit configured to calculate an edge straight line approximating the second edge point group.

2. The image processing apparatus according to claim 1, wherein the edge point feature amount calculation unit is configured to calculate inclinations between two successive points as the feature amounts.

3. The image processing apparatus according to claim 1, wherein the edge point feature amount calculation unit is configured to calculate inclinations and Y intercepts between two successive points as the feature amounts.

4. The image processing apparatus according to claim 1, wherein the distribution calculation unit is configured to calculate the distribution of the feature amounts using a plurality of widths or ranges of classes.

5. The image processing apparatus according to claim 1, further comprising a skew correction unit configured to perform skew correction on the document based on an edge straight line calculation result by the edge straight line calculation unit.

6. The image processing apparatus according to claim 1, further comprising a registration correction unit configured to correct a document registration based on an edge straight line calculation result by the edge straight line calculation unit.

7. An image reading device comprising:

the imaging unit configured to image the document at an imaging position where a background member serves as a background; and the image processing apparatus according to claim 1.

8. An image forming apparatus comprising:

the image processing apparatus according to claim 1; and an image forming unit configured to form an image processed by the image processing apparatus.

9. An image processing method comprising:

detecting a first edge point group comprising a set of edge points between a document background area and a document area in a read image of a document, the read image being output from an imaging unit;

calculating feature amounts from a plurality of edge points in the first edge point group and composing an edge point feature amount group;

calculating a distribution of the feature amounts of the edge points from the edge point feature amount group and calculating a feature amount corresponding to a maximum distribution;

selecting edge points corresponding to the maximum distribution from the first edge point group and selecting a second edge point group using a range of the feature amount corresponding to the maximum distribution calculated at the calculating the distribution; and calculating an edge straight line approximating the second edge point group.

10. The image processing method according to claim 9, wherein at the calculating the feature amounts, inclinations between two successive points are calculated as the feature amounts.

11. The image processing method according to claim 9, wherein at the calculating the feature amounts, inclinations and Y intercepts between two successive points are calculated as the feature amounts.

12. The image processing method according to claim 9, wherein at the calculating the distribution, the distribution of the feature amounts is calculated using a plurality of widths or ranges of classes.

13. The image processing method according to claim 9, further comprising performing skew correction on the document based on an edge straight line calculation result at the calculating the edge straight line.

14. The image processing method according to claim 9, further comprising correcting a document registration based on an edge straight line calculation result at the calculating the edge straight line.

\* \* \* \* \*